Dec. 27, 1938. A. FOULKS 2,141,210
AUTOMOBILE SIGNAL DEVICE
Filed Jan. 17, 1936 2 Sheets-Sheet 1
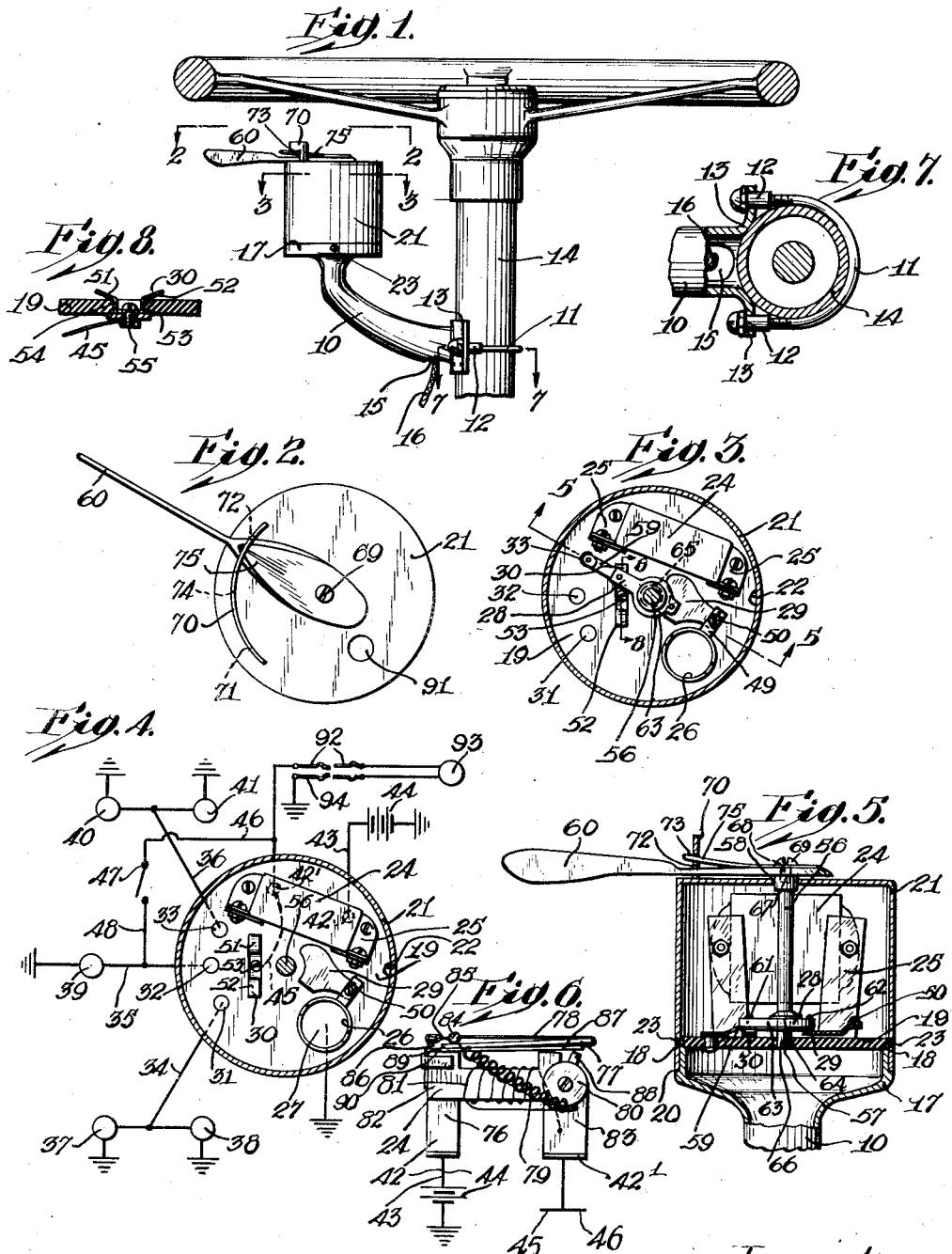
Inventor
Albert Foulks

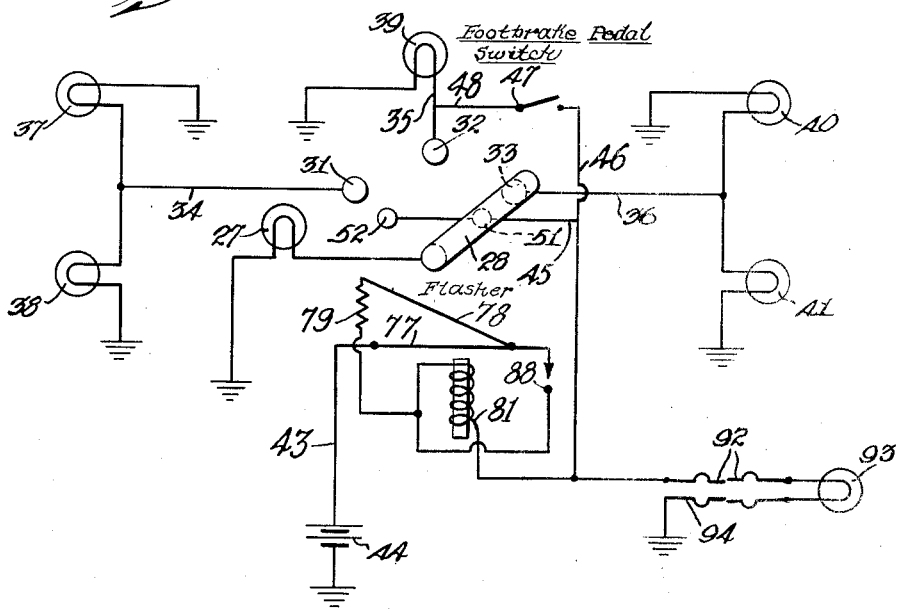

Patented Dec. 27, 1938

2,141,210

UNITED STATES PATENT OFFICE 2,141,210

AUTOMOBILE SIGNAL DEVICE

Albert Foulks, Mount Holly, N. J.

Application January 17, 1936, Serial No. 59,529

9 Claims. (Cl. 177—339)

The present invention relates to a signal system and to a device for controlling the signal lights of an automobile or the like, with an indication at a pilot light on the steering column of the proper operation of the signal lights.

A purpose of the invention is to provide a device of the character indicated adapted to easy and inexpensive manufacture and well suited to the needs of service.

A further purpose is to improve the indication of improper functioning of a driving signal by eliminating trouble through relay failures.

A further purpose is to show the improper functioning of the signal lights of an automobile or the like by variant rates of flashing of a pilot light visible to the driver of the car.

A further purpose is to mount cooperatively a flasher, a pilot or tell-tale light and a switch controlling the signal lights of an automobile or the like in a common casing positioned upon the steering column.

A further purpose is to cheapen and simplify the switch mechanism for controlling the signal lights of an automobile or the like.

A further purpose is to operate a flashing pilot in the same circuit with a flashing light visible outside the automobile.

Further purposes appear in the specification and in the claims.

I have elected to show one only of the different forms of my invention, selecting a form however that is practical and efficient in operation and which well illustrates the principles involved.

Figure 1 is an elevation, in part section, illustrating a desirable embodiment of my invention mounted upon the steering column of an automobile.

Figure 2 is an enlarged top plan view of part of the structure of Figure 1, in the position indicated by the line 2—2 of Figure 1.

Figure 3 is a section of Figure 1, upon the line 3—3 thereof and to enlarged scale.

Figure 4 is a view corresponding to Figure 3, but with some of the parts shown in Figure 3 removed in Figure 4, and with the circuit connections shown in Figure 4.

Figure 4a is a diagrammatic view of the electrical connections, omitting the structure shown in Figure 4.

Figure 5 is a section of Figure 3 taken upon the line 5—5 thereof in the direction of the arrows.

Figure 6 is a diagrammatic view of a detail not itself the invention of the applicant.

Figure 7 is a section taken upon the line 7—7 of Figure 1.

Figure 8 is a detail section upon the line 8—8 of Figure 3.

Like numerals refer to like parts in all figures.

Describing in illustration and not in limitation and referring to the drawings:—

In the past, switches for directional and other driving signals on automobiles have been mounted on the steering column, and have been operated manually to turn on at the proper time a front and rear signal light indicating a right turn, or a left turn. A pilot or tell-tale light within the switch casing has been visible through a window in the casing, and has been so electrically connected that it will only burn when the directional signal is properly functioning. Failure of one of the directional signal lights has operated a relay which broke the circuit of the pilot light and thus warned the operator.

The relay has had to be sufficiently sensitive that the failure of one of several lights in a signal circuit will break the pilot circuit. Difficulty with the relay has resulted in the return to the manufacturer of a substantial number of the devices heretofore sold, and in dissatisfaction in many other cases.

I propose to eliminate the relay connection between the signal circuits and the pilot light, and to dispense altogether with the relay, but to indicate failure to function of a signal light by changing the frequency of flashing of the pilot light. I also propose to simplify and cheapen the construction of the driving signal switch and to improve its operation as explained below.

A hollow bracket 10 is clamped by a U-bolt 11 and long cap nuts 12 extending through openings in lugs 13 to the steering column 14 of an automobile or the like. The automobile may of course be a pleasure or commercial vehicle, and the point of attachment need not be the steering column.

A hollow bracket 10, suitably of cast metal, is downwardly perforated at 15 to receive a cable 16 enclosing the different insulated wires of the electrical connections. The cable 16 will normally pass to a connection block behind the dash, beneath the hood, or at the base of the steering column, and from the connection block wires will go to the signal lights, battery, etc.

At its upper end the bracket 10 flares into a cup 17 that is internally shouldered at 18 to receive a fiber switch block 19 and externally shouldered at 20 to receive an outside casing 21. While the bracket 10 may conveniently be a die casting, it is preferred to assemble the outside casing 21 from pressed metal parts suitably secured together as by riveting, welding or the like.

The switch block 19 of suitable electrical insulation such as fiber, angularly registered upon its seat 18 by an interlocking lug and notch connection at 22 with the bracket, carries cooperating electrical fixtures and is held in place by screws 23.

The electrical fixtures upon the switch block include a flasher 24 upon a suitable bracket 25, a light socket 26 for a pilot or indicator light 27, and a switch 28. The switch includes spring electrical contact plates 29 and 30 and light contacts 31, 32 and 33, which are electrically connected by wires 34, 35 and 36 respectively to the left-turn front and rear signal lights 37 and 38, to the stop light 39 and to the right-turn front and rear signal lights 40 and 41. The stop light 39 and the directional signal lights 37, 38, 40 and 41 are grounded to the vehicle frame at their opposite terminals as in usual practice.

One terminal 42 of the flasher 24 connects by a wire 43 to the ungrounded side of the battery 44, whose opposite terminal is grounded as in ordinary practice. The other terminal 42' of the flasher 24 connects by wires 45 and 46 respectively to the spring contact plate 30 and to one side of a foot pedal brake operated switch 47 that is electrically connected from its other side through the wire 48 to the stop light 39.

The spring contact plate 29 is electrically connected to the pilot light socket 26, and clamped to place upon the block by a lug 49 from the light socket 26, screwed at 50 to the spring contact 29.

The spring contact 30 has toward its ends spring contact ears 51 and 52, overlapping and normally somewhat above the switch block, and, intermediate the ears, has a U-shaped body 53 within a perforation 54 of the fiber block, where it fastens at 55 by screw, nut, and washer connection within the perforation 54 and also connects to the wire 45 that leads from the spring contact 30 to one terminal of the flasher 24.

The operating switch includes a spindle 56 having a pivot support in central bores 57 and 58 respectively of the switch block 19 and outside casing 21, a spring contact plate 59 insulated from the spindle and an operating handle 60 that is located above the outside casing 21.

The contact plate 59 fastens by rivets 61 and 62 to a fiber plate 63 which is carried by the spindle 56 against a downwardly presented shoulder 64 thereof. The opening in the contact plate 59 through which the spindle 56 passes is sufficiently enlarged at 65 to avoid electrical contact between the spindle and the contact plate. The spindle 56 is squared at 66 and engages a squared opening in the fiber plate 63, so as to prevent the fiber plate from turning on the spindle.

At its upper end the spindle 56 passes through the central bore 58 of the top of the outside casing to receive the handle 60, being bored and tapped at 67 and formed noncircular at 68 for its rigid connection with the handle by a screw 69.

The operating handle 60 extends outwardly beyond the casing through a gauge plate 70, optionally an integral portion of the outside casing, which functions, at the opposite ends 71 and 72 of the opening passing the handle, as a stop gauge for the easy registry of the handle at its extreme positions, those for operating respectively the left-turn and right-turn signals. Along the downwardly presented edge 73, a central upward notch 74 cooperates with a spring detent 75 on the handle to register the handle in its normal mid position with the stop position of the switch. The detent 75 also functions continuously to spring press the spindle downwardly from the edge 73, thus bringing spring pressure to bear on the contact plate 59 without the necessity to use a separate spring for this purpose as in prior constructions.

The flasher is suitably of a commercial type not the invention of the applicant, and may function as indicated in Figure 6, which, while specifically illustrating one type of flasher, is intended for a broad indication of any flasher suited to be applied to the present invention.

Here the flasher of Schmidinger U. S. Patent No. 1,979,349 is shown. The current is intended to pass to one terminal 42 of the flasher from battery 44 by wire 43, thence to pass successively through conducting leg 76, swinging element 77, resistance tension wire 78, resistance wire 79, conducting plate 80, magnet coil 81 (around core 82) to the other conducting leg 83 and terminal 42' of the flasher and thence to the different signal circuits according to the setting of the operating handle 60.

The resistance tension wire 78, permissibly integral with the resistance wire 79, is connected at one end to the free end of element 77 and, extending diagonally from the element 77, is anchored by an insulating glass bead 84 and short anchor wire 85 to an upper portion 86 of the conducting leg 76.

As long as all of the current for the selected signal circuit passes through the resistance wires 78 and 79, the current is too low to illuminate the signal lamps, but the wire 78 rapidly heats by the current that does pass, its tension eases and the weak energization of the magnet is yet sufficient to pull a magnetizable swinging armature 87 to contact with the ear 88 of the conducting plate 80, thereby by-passing the resistance wires 78 and 79 and transmitting sufficient current to light the lamps in a signal circuit.

When by-passed, the wire 78, no longer carrying substantial current, rapidly cools, to tighten and open the by-passing circuit, the magnet being too weak to hold the armature 87 to contact with the plate 80 except when the wire 78 is hot, and the wire 78 only heating when the by-pass is open. When the wire 78 cools, it swings the free end of the element 77 upward and carries the free end of the armature 87 along, thus breaking the by-pass.

The process repeats over and over, with flashes of the lights in the flasher circuit during the successive by-passings of the resistance wires 78 and 79, and the rate of flashing is variant with the load on the flasher circuit (more slow the greater the current in that the tension wire 78 heats to a higher temperature and takes more time to cool the higher the current), so that the rate of flashing is much greater with only a one-lamp load in the flasher circuit than with a two-lamp load.

Therefore, if the front or rear signal lamp on the right-turn or left-turn circuit burns out or trouble develops in its socket or connections, the speed of flashing of the pilot lamp visible to the driver will greatly increase, due to decrease in load, and the driver, accustomed to the lower speed of flashing, will be warned that repairs are necessary.

The pilot lamp will preferably be designed to light on a much lower load than the signal lights. For example, in a desirable embodiment of the invention, the pilot lamp was only about 2 candle power while the signal lamps were each about 21 candle power. Under this arrangement, the load of the pilot lamp alone is so light that it preferably does not operate the flasher, and, if both directional signal lamps in a directional signal circuit burn out or fail to function, the pilot light will indicate that fact by burning continuously.

So if the stop lamp is of fairly heavy load-carrying capacity (say about 21 candle power) and the pilot lamp of light load-carrying capacity (say about 2 candle power), in case the stop lamp burns out or its circuit fails to function, the pilot light will indicate that fact by burning continuously when the foot brake is pressed with the switch in the mid-position.

Of course the continuous burning of the pilot lamp is made possible by having a sufficiently low resistance of the resistance wires 78 and 79 to pass a great enough current to light the pilot lamp, but a current too small to light a signal lamp.

The continuous lighting of the pilot light is practically obtained if the rate of flashing is too high to be visible to the eye.

The indication of defects by a change of the rate of flashing is much preferable to the breaking of the pilot light circuit by a relay, as in the prior art, as difficulty with the relay often caused failure of the signal or pilot light circuit, and lack of sensitivity of the relay prevented breaking or making of the pilot light circuit. If the swinging element 77 be secured at its fixed end to the armature 87 at 89, and the armature 87 have a spring supporting portion 90 which urges the armature toward contact with the ear 88 against the action of the resistance tension wire 78, any failure of the resistance tension wire 78 will simply result in a permanent contact between the armature 87 and the ear 88, so that the lights will operate continuously.

Normally the switch handle 60 remains in mid-position with its detent 75 registering in notch 74.

In this position, the driver closes the foot switch 47 in pressing the foot brake, and the closure of the switch 47 energizes the grounded stop light 39, from the battery 44, wire 43, flasher 24, wire 46, switch 47, and wire 35 and at the same time energizes the pilot or indicator light 27, from the battery 44, wire 43, flasher 24, wire 46, foot-brake operated switch 47, wire 35, terminal 32, spring contact plate 59 spring plate 29, lug 49, light socket 26, light 27, to ground at the opposite terminal of the light.

The flashing of the indicator light 27, visible to the driver through a suitable window 91 of the outer casing, covered with cellulose transparent material, with the handle in its mid-position, proceeds at the rate determined by the load on the stop light and pilot light when the pedal switch 47 is closed, provided that the stop light correctly operates, but if the stop light fails to operate the failure is made evident to the driver by the great increase in the rate of flashing or the continuous operation of the pilot lamp, depending upon the size of the resistance wires 78 and 79 and of the pilot light.

If the driver signals a left turn by throwing the handle 60 all the way down (Figure 2), the front and rear left-turn grounded signal lights 37 and 38 are energized from the battery 44, wire 43, flasher 24, wire 45, spring contact plate 30, switch contact plate 59, contact 31 and wire 34 while at the same time the grounded indicator light 27 is energized from the energized switch contact plate 59, spring contact 29, lug 49 and pilot light socket 26.

In normal correct operation of the left-turn signals, the current through the flasher 24 is that for the two lights 37 and 38 and the pilot light 27. If the rate of flashing, as shown by a glance at the window 91 over the light 27, is the normal one for these three lights, the driver knows the signals are functioning rightly, but if one of the lights 37 and 38 has failed, the driver will know it by the abnormally high rate of flashing—or, if both lights have failed, by a still higher rate of flashing, or continuous operation of the pilot.

If the driver while signaling left turn operates the brake he will thereby close the pedal switch 47, to operate the stop light as already explained, and the added current through the flasher will slow down the rate of flashing to indicate to the driver the right functioning of the stop signal. If there should be no slowing in the rate of flashing at the indicator light when the brake is depressed it would indicate to the driver a failure of the stop light 39 to rightly function.

If the driver signals a right turn by throwing the handle 60 all the way up (Figure 2), the front and rear right-turn signal lights 40 and 41 are energized as explained for the left-turn lights, a normal rate of flashing at the indicator light will show correct functioning of both right-turn signal lights, an abnormally high rate of flashing will indicate that one of the right-turn signal lights is failing to function while a still higher rate of flashing (or continuous operation) will indicate that both right-turn signal lights have failed.

And if the driver operates the brake while signalling right turn, a correct functioning of the stop signal will be shown by a slowing in the rate of flashing when the brake is depressed, or if the stop signal should fail to function this will become evident to the driver by the lack of change in the rate of flashing when the brake is depressed.

It will be evident that the flasher receives both the signal circuit current and the pilot current, but that the signal lamps are in parallel with the pilot lamp and preferably with one another. Various combinations of series or parallel arrangements may be worked out to apply the principles of the invention.

As an assistance to the driver who must make an emergency stop (to change a tire, etc.) and possibly work on the traffic side of his vehicle, I provide a readily detachable connection (suitably a plug and a jack 92 mounted on the automobile) to the flasher 24, for a flashing road beacon lamp 93, which is desirably grounded to a grounding contact 94 in the jack. The flashing road beacon will operate then on the stop switch position.

It will be evident that the flasher can be eliminated and some advantage be obtained from the use of the switch. However, I do not recommend this except for economy.

Where reference is made herein to a signal circuit or the like it is intended to include a stop signal circuit as well as a right turn or left turn signal circuit.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In an automobile signal device, a casing having an opening, a bracket for securing the casing in a position convenient to the driver, a directional signal switch in the casing, connected to a circuit of a signal lamp and having a handle accessible outside the casing to shift the switch position, a pilot lamp in the casing connected to the switch in parallel with the circuit of the signal lamp and visible to the driver through the opening and a flasher connected through the switch to the circuit of the signal lamp and to the pilot lamp to cause flashing of the pilot lamp in accordance with the flashing of the signal circuit.

2. In a signal device for use adjacent the steering wheel of a motor vehicle, a lower casing, a disk therein of insulation material, signal terminals thereon to be connected respectively to various circuits of the vehicle, an upper casing fitting downwardly upon the lower casing, a switch including a spindle pivoting at its lower and upper ends respectively in the disk and in the top of the upper casing and electrically connecting with the terminals selectively according to the angular position of the switch, contact members between the switch and disk including means for pressing the switch resiliently upwardly, a handle rigidly fastened to the spindle at the upper end thereof above the outer casing, a gauge for determining the positions of the handle and including spaced abutments limiting the angular movement of the handle, a bridge angularly between the abutments above the handle and having an upward notch intermediate the abutments, and a spring detent fastened at one end to the handle and at the other end compressed against the bridge, cooperating with the said contact members by pressing the handle and therefore the switch downwardly against the resilient upward reaction of the contact members and at the notch registering the switch in an intermediate position.

3. In an automobile lighting system, a lamp on the automobile visible from outside the automobile, a pilot lamp visible to the driver, a flasher including a shunt and a resistance which by its temperature causes opening and closing of the shunt and so determines the rate of flashing, means for connecting the lamp visible from the outside and the pilot lamp in parallel and for connecting said parallel connected lamps in series with the flasher resistance, and a source of current for lighting the lamps and operating the flasher in series with the flasher and with said parallel connected lamps, whereby change in flashing rate of the flasher indicates malfunctioning of the system.

4. In an automobile lighting system, a flasher including a shunt and a resistance which by its temperature causes opening and closing of the shunt and so determines the rate of flashing, a plurality of lamps visible from outside of the automobile, a circuit connecting each of said lamps visible from the outside in series with the flasher resistance and in parallel with one another, a pilot lamp, a circuit connecting the pilot lamp and the flasher resistance in series and connecting the lamps visible from the outside and the pilot lamp in parallel and a source of current in series with the flasher resistance and with the parallel connected lamps.

5. In an automobile lighting system, a lighting circuit having a plurality of lamps in parallel, a thermostatic flasher having a shunt and a resistance which by its temperature causes opening and closing of the shunt, said resistance being connected in the lighting circuit in series with the lamps and the current through the resistance controlling flashing of said lamps in common, a pilot lamp connected in series with the flasher heating element and in parallel with the said lamps to indicate, by change in its rate of flashing, a change in resistance in the lighting circuit and a source of current in series with the flasher resistance and with the parallel connected lamps.

6. In an automobile lighting system, a stop light circuit having a stop light lamp, a pilot light circuit having a pilot lamp, a switch controlling operation of the stop light, a thermostatic flasher having a permanent higher resistance path and an intermittent lower resistance shunt, the rate of heating of said higher resistance path determining the rate of flashing of the flasher, connections placing said stop light circuit and said pilot light circuit in parallel with one another and in series with said higher resistance path and with its shunt when closed, the flasher controlling flashing of the stop light and of the pilot light when the switch is closed, and the resistance of the higher resistance path of the flasher being low enough to pass a sufficient current to light the pilot light continuously in case of failure of the stop light.

7. In an automobile signal switch device, a casing, a source of electrical energy, a flasher, a switch in the casing having a plurality of signal circuit contacts each making contact with one side of a separate signal circuit and having a contact connected through the flasher to one side of the source, a plurality of signal circuits having signal lamps each connected at one side to one of the signal circuit contacts, a source of electrical energy connected at the other side to the other side of each of the signal circuits, the flasher being electrically connected between said switch contact connected to the source and the source, the switch connecting the flasher selectively with any signal circuit.

8. In an automobile signal system, a swingable switch contact plate, a plurality of first fixed contacts positioned so as to be selectively touched by the swingable switch contact plate and each of said first fixed contacts being connected to its respective circuit including a directional signal lamp, a plurality of second fixed contacts positioned so that one of them will be touched by the swingable switch contact plate when it touches one of the first contacts and another of them will be touched by the swingable switch contact plate when it touches another of the first contacts, said second fixed contacts being connected to the ungrounded side of a battery and a third fixed contact touching the swingable switch contact plate in the positions corresponding to connection with said first contacts and being connected to one side of a pilot lamp, in combination with circuits of said directional signal lamps, a battery grounded at one side, a flasher in series with the battery, and a pilot lamp grounded at one side.

9. In a signal device for use adjacent the steering wheel of a motor vehicle, a flasher, a pilot light, signal terminals to be connected respectively to signal lights of the vehicle, a switch having a handle for presentation in a position accessible to the driver and at different positions selectively connecting to the said terminals, electrical connections between the pilot light and switch at the operating positions thereof, a contact connected to a source of electrical energy and adapted to energize the switch in its signal positions, a common mount to fasten the flasher, the pilot light, said terminals and said contact in a position adjacent the driver, connections for energizing the flasher and the said contact from the flasher and other connections including a switch operated when the vehicle is braked for energizing from the flasher the connection between one of the switch terminals and its corresponding signal light.

ALBERT FOULKS.